United States Patent
Zhang et al.

(10) Patent No.: US 7,636,480 B2
(45) Date of Patent: Dec. 22, 2009

(54) SUPER RESOLUTION ENCODING

(75) Inventors: Yeqing Zhang, Penfield, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 960 days.

(21) Appl. No.: 11/149,522

(22) Filed: Jun. 10, 2005

(65) Prior Publication Data

US 2006/0279749 A1    Dec. 14, 2006

(51) Int. Cl.
*G06K 9/36* (2006.01)
*H04N 7/12* (2006.01)
*H04B 1/66* (2006.01)

(52) U.S. Cl. .............. 382/232; 382/282; 382/293; 348/384.1; 375/240; 358/426.01

(58) Field of Classification Search ......... 382/232–253, 382/282–283, 293–300; 348/384.1–423.1; 375/240–241; 358/539, 426.01–426.07
See application file for complete search history.

(56) References Cited

U.S. PATENT DOCUMENTS

| | | | |
|---|---|---|---|
| 5,276,532 A | | 1/1994 | Harrington |
| 5,579,445 A | * | 11/1996 | Loce et al. .................... 358/1.2 |
| 5,677,735 A | * | 10/1997 | Ueno et al. ............. 375/240.15 |
| 5,689,343 A | * | 11/1997 | Loce et al. .................. 358/3.21 |
| 5,696,848 A | * | 12/1997 | Patti et al. .................... 382/254 |
| 5,870,502 A | * | 2/1999 | Bonneau et al. ............. 382/249 |
| 6,020,923 A | * | 2/2000 | Hosaka et al. ......... 375/240.12 |
| 6,020,979 A | | 2/2000 | Zeck et al. |
| 6,661,463 B1 | * | 12/2003 | Geshwind ................ 348/384.1 |
| 6,738,159 B2 | | 5/2004 | Harrington |
| 6,757,431 B2 | * | 6/2004 | Loce et al. .................. 382/209 |
| 7,123,768 B2 | * | 10/2006 | Mori .......................... 382/181 |
| 7,327,904 B2 | * | 2/2008 | Zhou et al. .................. 382/299 |

\* cited by examiner

*Primary Examiner*—Manav Seth
(74) *Attorney, Agent, or Firm*—Fay Sharpe LLP (57) ABSTRACT

A method for encoding high resolution data to a form having a reduced number of bits can include predefining a plurality of high-output-resolution output patterns, associating respective output-resolution output patterns of the plurality with respective encoded resolution bit patterns, receiving a block of input-resolution input data, determining a respective difference between a pattern of the received block of input data and the respective output-resolution output patterns, selecting a respective output-resolution output pattern associated with a lowest respective difference to be a representative output pattern for the received block of input data and encoding the received block of input-resolution input data as the respective encoded resolution bit pattern associated with the selected respective representative high-output-resolution output pattern. A system includes a library of output patterns in association with encoded resolution bit patterns, a block analyzer, a block selector and an encoder.

23 Claims, 7 Drawing Sheets

SUPER RESOLUTION ENCODING

BACKGROUND

The methods and systems illustrated herein in embodiments are related generally to the art of data compression. More specifically, methods and systems will be described for compressing high or super resolution image data for storage and/or transmission. Embodiments will be described with reference to compressing high or super resolution image data associated with text or line art. However, embodiments may be beneficially implemented in other data compression applications.

Advancements in the computational power of image processors and the rendering resolution of marking engines have outpaced advancements in data storage and transmission. That is, image processors and image rendering devices or marking engines for achieving a given image quality and image throughput (e.g., pages per minute) are relatively inexpensive when compared to the cost of data storage and transmission components that would be required to support that given image quality and throughput. Nevertheless, it is desirable to achieve the benefits of high speed data processing and high resolution image rendering.

For example, it is desirable to render text and line art, which can include curves and diagonal lines, with high or super resolution, such as, for example, 1200, 2400 or 3600 spots per inch (spi), in order to reduce or avoid perceptible jaggedness or "jaggies" in the rendered or printed text or line art.

In order to take full advantage of the jaggedness reducing aspects of super or high resolution rendering, it is necessary for an image source, such as an image processor or Digital Front End (DFE) to perform high or super resolution digital image processing. For example, a DFE may raster image process (RIP) a Page Description Language (PDL) version of an image to a high or super resolution to provide for better edge position estimation and to provide a reduction in perceived jaggedness in a rendered version of the image.

However, a single page of high or super resolution (e.g., 2400 spi) binary or bit map color image data can require up to two gigabytes or more of data storage and/or transmission. Furthermore, in production printing environments, it is common to render over 100 pages per minute. Therefore, the cost of providing storage and communication resources adequate to the task of super resolution data storage and transmission can be quite high.

Therefore, there is a desire for methods and systems for compressing or encoding high or super resolution image data while preserving the beneficial aspects provided by high or super resolution image processing and rendering.

BRIEF DESCRIPTION

A method for encoding high resolution data associated with a relatively large number of bits to an encoded form having a relatively reduced number of bits can include predefining a plurality of high-output-resolution output patterns, associating respective high-input-resolution output patterns of the plurality with a respective encoded resolution bit pattern having the reduced number of bits, receiving a block of high-input-resolution input data, determining a respective difference between a pattern of the received block of high-input-resolution input data and each of the respective high-output-resolution output patterns, selecting a respective high-output-resolution output pattern associated with a lowest respective difference to be a representative high-output-resolution output pattern for the received block of high-input-resolution input data and encoding the received block of high-input-resolution input data as the respective encoded resolution bit pattern, having the reduced number of bits, associated with the selected respective representative high-output-resolution output pattern.

A system that is operative to encode data associated with a relatively large number of bits to an encoded form having a relatively reduced number of bits can include a library of respective high-output-resolution output patterns associated with respective encoded resolution bit patterns having the reduced number of bits, a data analyzer that is operative to receive a block of high-input-resolution input data and determine a respective difference between a pattern of the received block of high-input-resolution input data and each of the respective high resolution output patterns, a block selector that is operative to select a respective high-output-resolution output pattern associated with a lowest respective difference to be a representative high-output-resolution output pattern for the received block of high-input-resolution input data, and an encoder that is operative to encode the received block of high-input-resolution input data as the respective encoded resolution bit pattern, having the reduced number of bits, associated with the selected respective representative high-output-resolution output pattern, thereby generating an encoded block of data.

DETAILED DESCRIPTION

Figure 1:
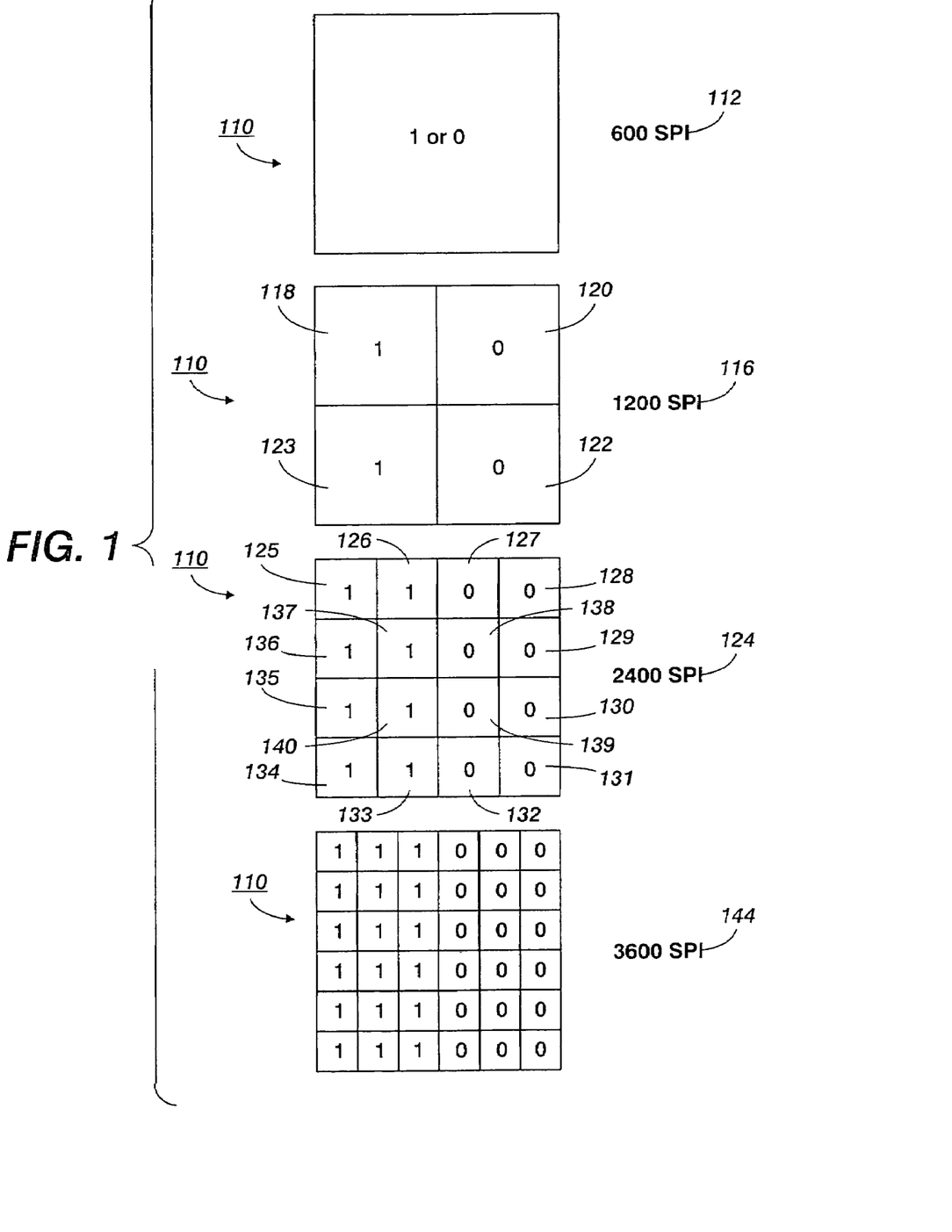
FIG. 1 includes a depiction of an image area in relation to several different respective spot sizes associated with several different respective image rendering resolutions.

Referring to FIG. 1, an image area 110 can be associated with marking spots of different sizes or pitch. For example, a 600 spot per inch (spi) 112 rendering resolution is common. However, the 600 spi resolution 112 is associated with limited image quality. For instance, at 600 spi resolution 112, the image area 110 must either be completely marked (e.g., associated with the value 1) or unmarked (e.g., associated with the value 0). If the marking resolution is increased, additional detail can be provided. For instance, at a 1200 spi resolution 116, the image area 110 is associated with 4 markable spot positions 118, 120, 122, 123. Each of the 4 spot positions can be marked or unmarked. This means that at 1200 spi resolution 116, the image area 110 can represent 5 shades of gray (completely marked, completely unmarked, or 1, 2 or 3 sub areas marked). Additionally, the sub areas can be marked with 14 different spatial orientations or patterns for a total of 16 possible patterns in the image area 110. At a 2400 spi resolution 124, the image area 110 is associated with 16 spot or marking areas 125-140, and the image area can represent 17 shades of gray or lightness. Additionally, marks can be distributed over the image area 110 in over 65,500 patterns or arrangements of marked or unmarked spots. At 3600 spi resolution 144, the image area 110 is associated with 36 markable spots, which can be associated with 37 shades of gray or lightness and over 68 billion arrangements of marked and unmarked spots or patterns.

The increase in the number of markable patterns associated with an increase in marking resolution can provide an increase in image quality. For instance, a sharpness with which text and line art can be rendered is increased with increasing marking resolution.

Figure 2:
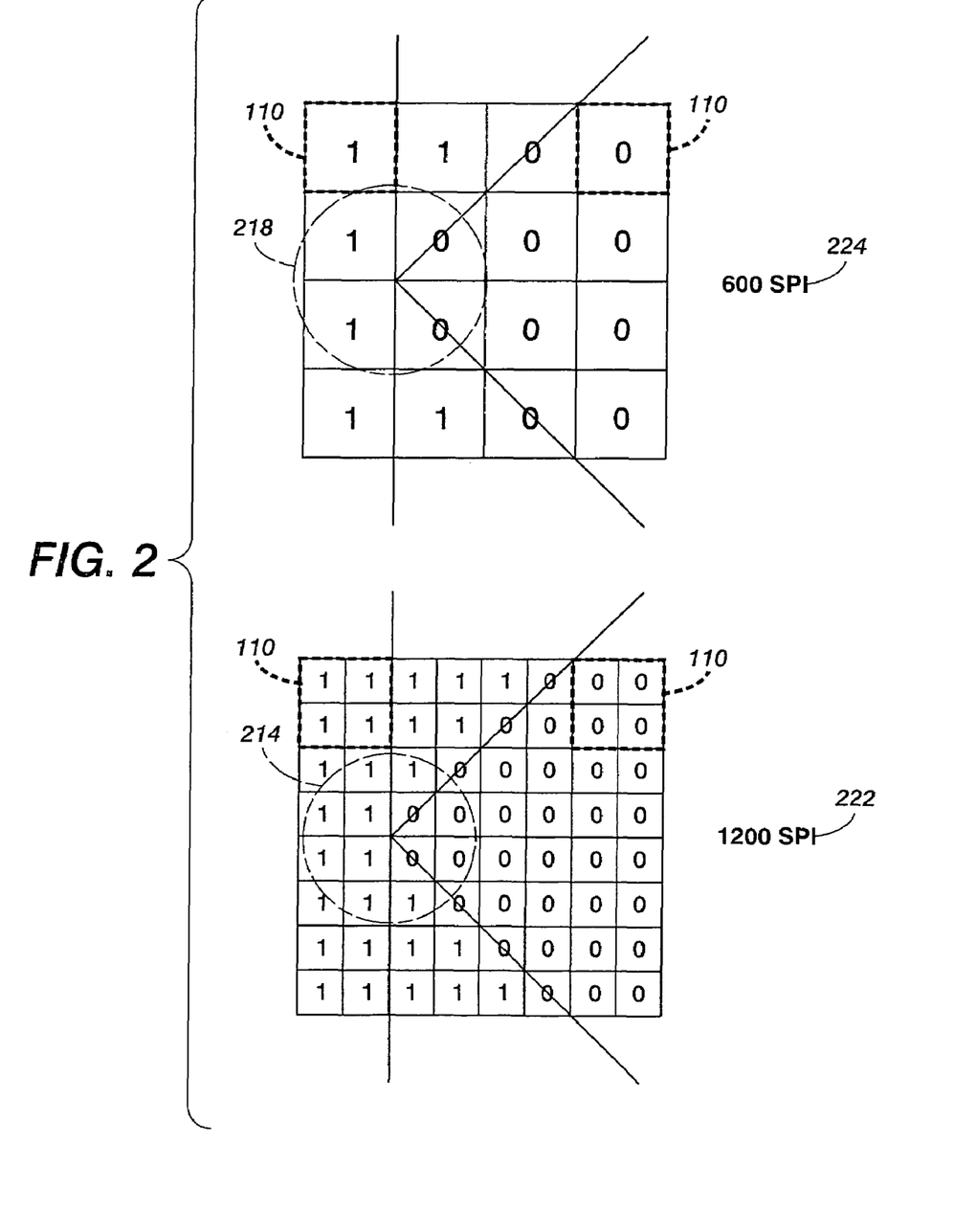
FIG. 2 includes a depiction of an image area associated with a portion of an image of text at two different image resolutions.

For example, referring to FIG. 2, an intersection 214, 218 of a vertical line and two diagonal lines is rendered with increased precision and a decrease in perceptible jaggedness at 1200 spi resolution 222 as compared to the rendering possible at 600 spi resolution 224. Further image improvements are possible when rendering is carried out at even higher resolutions (e.g., 2400 spi, 3600 spi). However, as indicated above, storing and communicating high or super high resolution data can be prohibitively expensive.

Figure 3:
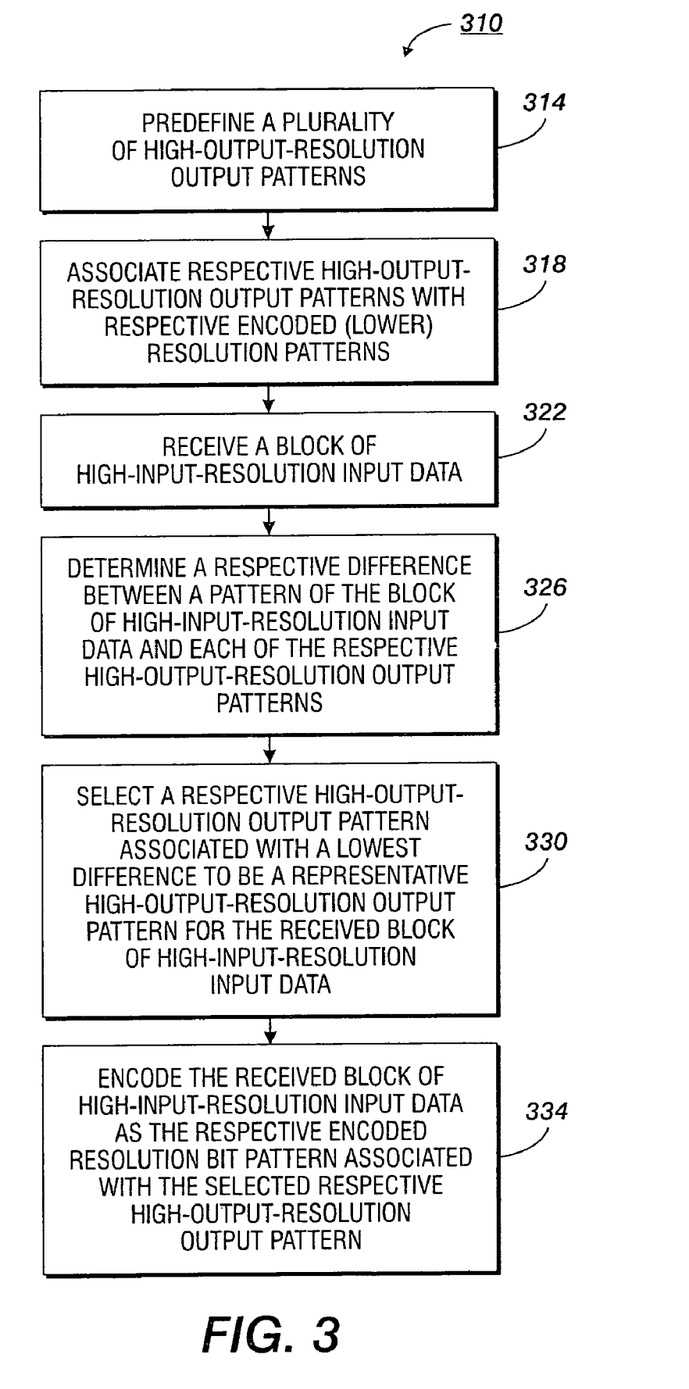
FIG. 3 is a flow chart outlining a method for encoding data.

Referring to FIG. 3, a method 310 for encoding high resolution data associated with a relatively large number of bits to an encoded form (that can be reasonably stored and communicated) having a relatively reduced number of bits can include predefining 314 a plurality of high-output-resolution output patterns, associating 318 respective high-output-resolution output patterns with respective encoded (lower) resolution bit patterns, receiving 322 a block of high-input-resolution input data, determining 326 a respective difference between a pattern of the block of high input data and each of the respective high-output-resolution output patterns, and selecting 330 a respective high-output-resolution output pattern associated with a lowest difference to be a representative high-output-resolution output pattern for the received block of high-input-resolution input data and encoding 334 the received block of high-input-resolution input data as the respective encoded resolution bit pattern associated 318 with the selected respective high-output-resolution output pattern.

Predefining 314 a plurality of high-output-resolution output patterns can include identifying important high resolution output patterns. For instance, the importance of an output pattern may be related to the frequency with which the output pattern would be used. A test image can be divided into blocks and statistically analyzed to determine a frequency of occurrence of various block patterns. Identified patterns that occur most frequently, as determined through the statistical analysis, can be identified or labeled as most important output patterns. Additionally, or alternatively, other factors may be considered when predetermining 314 the plurality of high-output-resolution output patterns.

For instance, output patterns most likely to benefit from high resolution rendering, such as, for example, patterns associated with diagonal lines and curves may be included in the predefined 314 plurality of high-output-resolution output patterns. Additionally, or alternatively, output patterns that exhibit a high level of compactness and, therefore, a high level of renderability, may be included in the predetermined 314 plurality of high-output-resolution output patterns.

The number of high resolution output patterns included in the predefined 314 plurality may be a function of the number of bits to be included in the encoded resolution bit pattern. For example, where it is desired to encode blocks of 16 bits of 2400 spi data or blocks of 36 bits of 3600 spi data with 8 bits of encoded or low resolution data, there may be 256 high-output-resolution output patterns in the predefined 314 plurality. That is, of the over 65,500 possible patterns at 2400 spi or the over 68 billion patterns available at 3600 spi, 256 patterns would be included in the predefined 314 plurality if it is desired to encode such patterns with just 8 bits.

For instance, associating 318 respective high-output-resolution output patterns with respective encoded resolution bit patterns can include a simple random assignment or enumeration of the plurality of predefined 314 output patterns. For instance, each of the output-resolution output patterns of the predefined 314 plurality can be assigned a number from 0 to 255 in some arbitrary manner. Alternatively, as will be illustrated below, each output-resolution output pattern in the predefined 314 plurality can be associated with a low or encoded resolution pattern that represents the high resolution output pattern.

Receiving 322 a block of high-input-resolution input data can include receiving a block of data at any resolution for which storage or transmission at a lower resolution is desired. In this regard, the phrase—high input resolution—refers to any resolution higher than the encoded resolution. Similarly, the phrase—high output resolution—refers to any resolution higher than the encoded resolution. The input and output resolutions may be the same or different. The received 322 input data can be a portion of a binary bit map (e.g., FIG. 1, FIG. 2) or, as will be explained in greater detail below, can include contone, multi-gray level or high-addressable data indicating levels of gray or lightness beyond the two levels represented by binary data. The received 322 input data may be associated with one or more tags indicating, for example, that the data is related to text and/or line art, or a portion of an image for which high resolution rendering is desired.

Determining 326 a respective difference between a pattern of the block of high-input-resolution input data and each of the respective high-output-resolution output patterns may be achieved through a number of different techniques. For example, referring to FIG. 4, where the input resolution of the input data and the output resolution of the output patterns are the same, determining 326 the respective difference between the pattern of the block of input-resolution input data and each of the respective output-resolution output patterns can include determining a closeness metric comparison or spatially-dependent Exclusive ORing between the input pattern and each of the output patterns. For instance, a first illustrative input pattern 410 exactly matches a first illustrative output pattern 412. Therefore, a spatially dependent, bit-wise Exclusive ORing (XOR) of the first input pattern 410 and the first output pattern 412 would yield a first comparison or difference pattern made up entirely of zeros.

Figure 4:
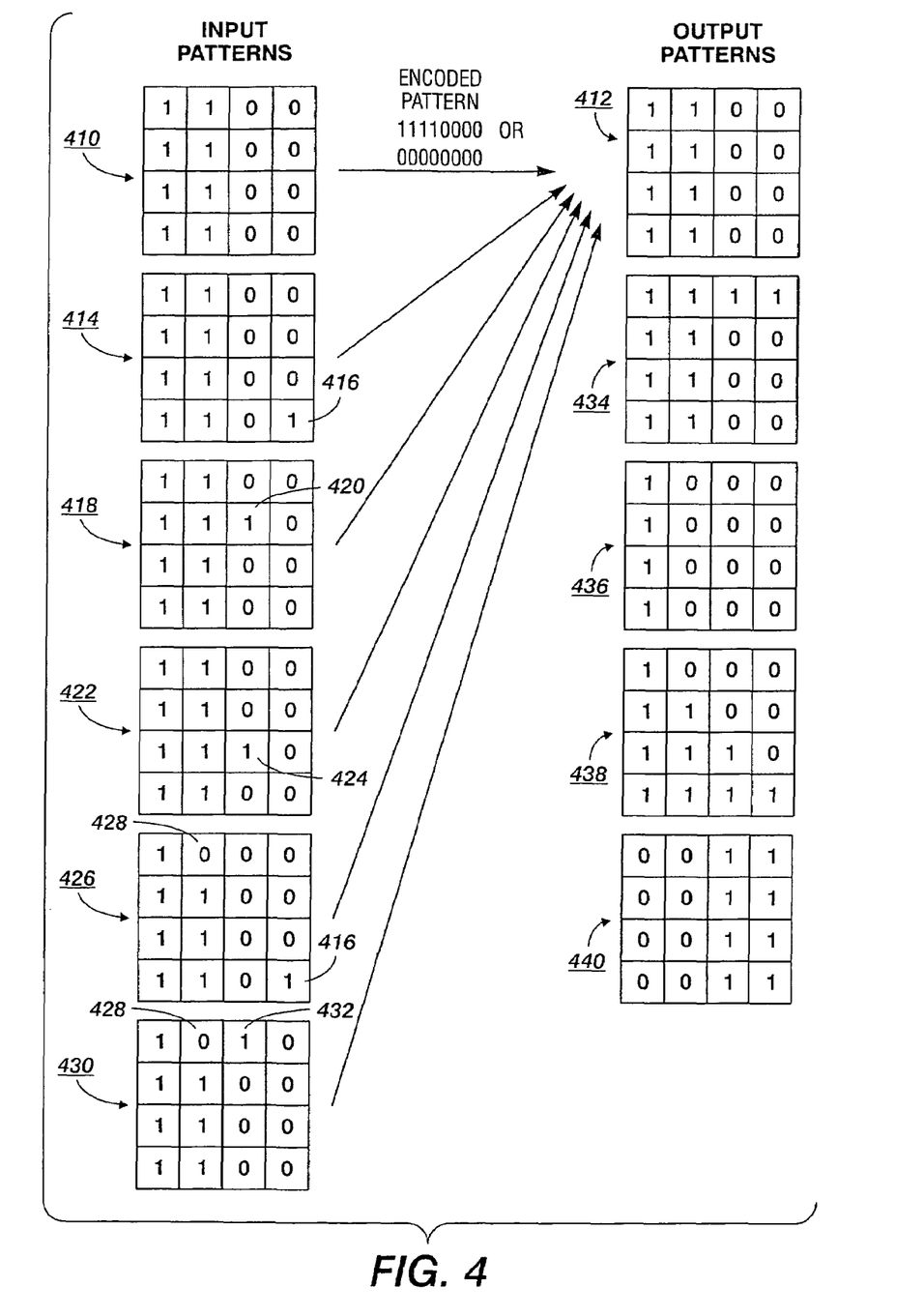
FIG. 4 includes illustrative input patterns and output patterns and a depiction as to how the input patterns might be mapped and/or encoded according to embodiments of the method of FIG. 3.

A second illustrative input pattern 414 is similar to the first input pattern 410, except that the second input pattern includes a lower right-hand corner 416 spot value of 1 where the first pattern 410 has a spot value of 0. A comparison or XOR of the second input pattern 414 with the first output pattern would indicate a one-bit difference at the lower right hand corner.

A third illustrative input pattern 418 is similar to the first input pattern 410, except that it includes a spot value of 1 in a third column, second row position 420 where the first pattern includes a spot value of 0. A fourth illustrative input pattern 422 is similar to the third input pattern 418, except that instead of having a spot value of 1 in the third column, second row position 420, the fourth input pattern 422 has a spot value of 1 in a third column, third row position 424. A comparison or XOR of the third and fourth input patterns 418, 422 with the first output pattern 412 would yield or determine 326 singlebit differences in the third column, second row, and third column, third row positions, respectively.

A fifth illustrative input pattern 426 is similar to the second input pattern 414 in that it includes a mark indication or spot value of 1 in the lower right hand position 416. Additionally, the fifth input pattern 426 includes a spot value of 0 or unmark at a second column, first row position 428 where the first, second, third, fourth 410, 414, 418, 422, input patterns and the first output pattern 422 includes a spot value of 1 or mark. A comparison or XOR of the fifth input pattern 426 with the first output pattern 412 would yield a determination 326 that the patterns 426, 412 differ at 2 bit positions, the lower right had corner 416 and the second column, first row position 428.

A sixth illustrative input pattern 430 is similar to the fifth illustrative input pattern 426 in that it includes a 0 spot value in the second column, first row position 428. However, instead of including a spot value of 1 in the lower right-hand corner position 416, the sixth illustrative input pattern 430 includes a spot value of 1 in the third column, first row position 432. A comparison or XOR of the sixth input pattern 430 with the first output pattern 412 yields a determination 326 that the patterns differ by a bit count of 2 associated with the second and third column, first row positions 428 and 432.

A visual comparison of the input illustrative patterns 410, 414, 418, 422, 426, 430 with illustrative second 434, third 436, fourth 438 and fifth 440 illustrative predetermined 314 output patterns allows one to determine 326 that greater differences are associated with the input patterns 410, 414, 418, 422, 426, 430 and the second, third, fourth and fifth output patterns 434-440 than the differences that are associated with each of the input patterns 410, 414, 418, 422, 426, 430 and the first output pattern 412. Therefore, if the received 322 block of high-input-resolution input data were any of the illustrative input patterns 410, 414, 418, 422, 426, 430, the first output pattern 412 would likely be selected 330, as the respective high-output-resolution output pattern associated with the lowest difference, to be the representative high-output-resolution output pattern for the received 322 block of high-input-resolution input data and each of the illustrative input patterns 410, 414, 418, 422, 426, 430 would be mapped to or encoded 334 as the respective encoded resolution bit pattern associated 318 with the selected (e.g., the first output pattern 412) output pattern.

For instance, the first output pattern 412 may have been arbitrarily associated 318 with a first encoded resolution bit pattern, such as 00000000 (because, for example it might be a first output pattern, i.e., number 0) or a more meaningful encoded pattern such as 11110000 (which bears some resemblance to the first output pattern 412) and might be considered a lower resolution version thereof.

When the input resolution of the received 322 block of input data does not match the output resolution of the plurality of predefined 314 output patterns, determining 326 a respective difference between the pattern of the block input-resolution input data and each of the respective output-resolution output patterns may include consideration of marked and unmarked image areas associated with the respective input and output patterns. For example, referring to FIG. 5, if received input patterns have a resolution of 2400 spi and the predefined 314 plurality of output patterns are at a resolution of 3600 spi, then there isn't a 1-to-1 correspondence between input bits and output bits. Nevertheless, image areas associated with the input patterns and the output patterns can be compared. For instance, an arrangement of four 2400 spi spots can be associated with the same image area as an arrangement of nine 3600 spi spots. Larger areas may also be considered. For instance, an area associated with sixteen 2400 spi spots can be the same as an area associated with thirty-six 3600 spi spots.

Figure 5:
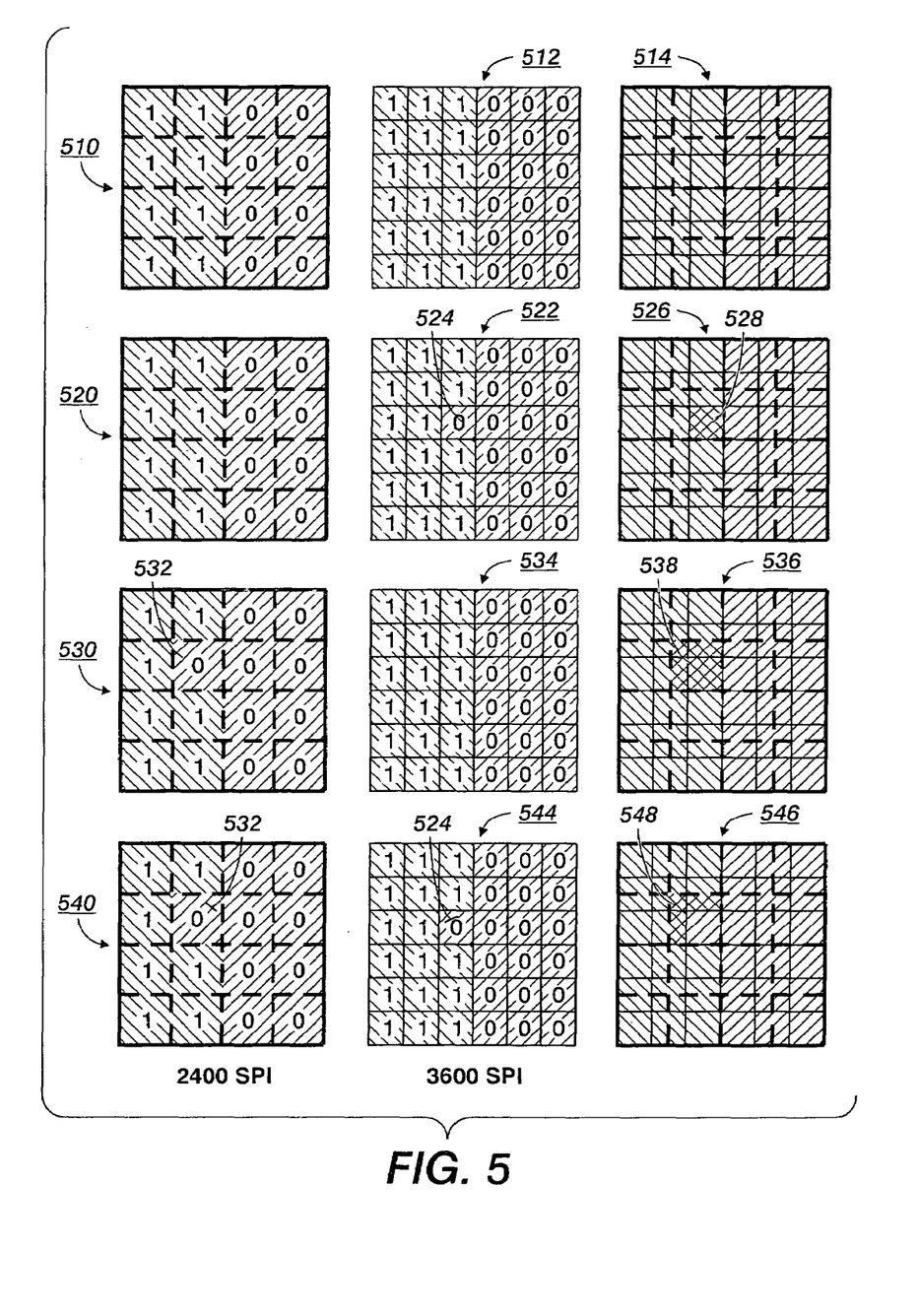
FIG. 5 includes illustrative input and output patterns as well as overlays illustrating a determination of area differences associated with embodiments of the method of FIG. 3.

Referring to FIG. 5, wherein in spots associated with a spot value of 1 are also associated with upward slanting shading lines and spot positions associated with spot values of 0 are also associated with downward sloping shading lines, a first illustrative input-resolution input pattern 510 matches a first illustrative output-resolution output pattern 512 because when marked and unmarked areas associated with each pattern are compared, the areas exactly coincide. For instance, a first overlay 514 includes no areas of cross hatching. Cross hatching would indicate that a portion of the overlay 514 is associated with a value of 1 in one of the patterns 510, 512 and a value of 0 in the other pattern.

For instance, a second input pattern 520 is the same as the first input pattern 510. However, a second output pattern 522 includes a 3600 spi spot 524 associated with a value of 0 where the first output pattern 512 has a spot associated with a value of 1. A second overlay 526 includes an area of cross hatching 528 indicating a determined 326 respective difference between the second input pattern 520 and the second output pattern 522. For instance, the cross-hatched area 528 is the total area associated with the 0-valued 3600 spi spot 524. The spot area 524 covers 1/36 of the entire pattern area 522. Therefore, a closeness metric indicating a difference between the second input pattern 520 and the second output pattern may be related to this 1/36 area difference.

A third illustrative input pattern 530 is similar to the first and second illustrative input patterns 510, 520 except that the third input pattern 530 includes a spot value of 0 at a second column, second row position 532 where the first two patterns 510, 520 included a spot value of 1. A third illustrative output pattern 534 is the same as the first illustrative output pattern 512. A third overlay 536 includes a cross-hatched area 538 indicating a determined 326 difference between the third input pattern 530 and the third output pattern 534 to be the entire area of the 0-valued second column, second row spot position 532. The area associated with that spot position 532 makes up 1/16 of the area associated with the input and output patterns 530, 534. A closeness metric describing the determined 326 difference between the third input pattern 530 and the third output pattern 534 may be based on this 1/16 area difference.

An illustrative fourth input pattern 540 is similar to the third input pattern 530 and includes a spot value of 0 in the second row, second column position 532. A fourth illustrative output pattern 544 is similar to the second output pattern 522 and includes a spot value of 0 in the third column, third row position 524. A fourth overlay 546 includes a hatched area 548 corresponding to a difference between the area of the second row, second column, 0-valued spot position 532 of the fourth input pattern 540 and the third column, third row, 0-valued spot position 524 of the fourth output pattern 544. As indicated above, spots associated with the illustrative 2400 spi input patterns represent 1/16 of the area associated with the input pattern, and spot areas associated with spots of the illustrative 3600 spi output patterns represent 1/36 of that area. Therefore, a closeness metric indicating a determined 326 difference between the fourth input pattern 540 and the fourth output pattern 544 may be based on portions of those areas illustrated as the cross-hatched area 548 of the overlay 546 or 5/144 of the area associated with the input and output patterns.

A respective difference between a pattern of a block of high-input-resolution input data and each of the respective high-output-resolution output patterns can be determined 326 even when the received 322 block of high-input-resolution input data is received 322 in the form of contone, multi-gray level or high-addressable pixel data. For example, referring to FIG. 6, an illustrative block of input data 614 includes first, second, third and fourth contone values 616, 618, 620, 622. A key pattern 624 represents a high-output-resolution output pattern and includes a first, second, third and fourth 626, 628, 630, 632 contone, multi-gray level or high-addressable pixel data values.

Figure 6:
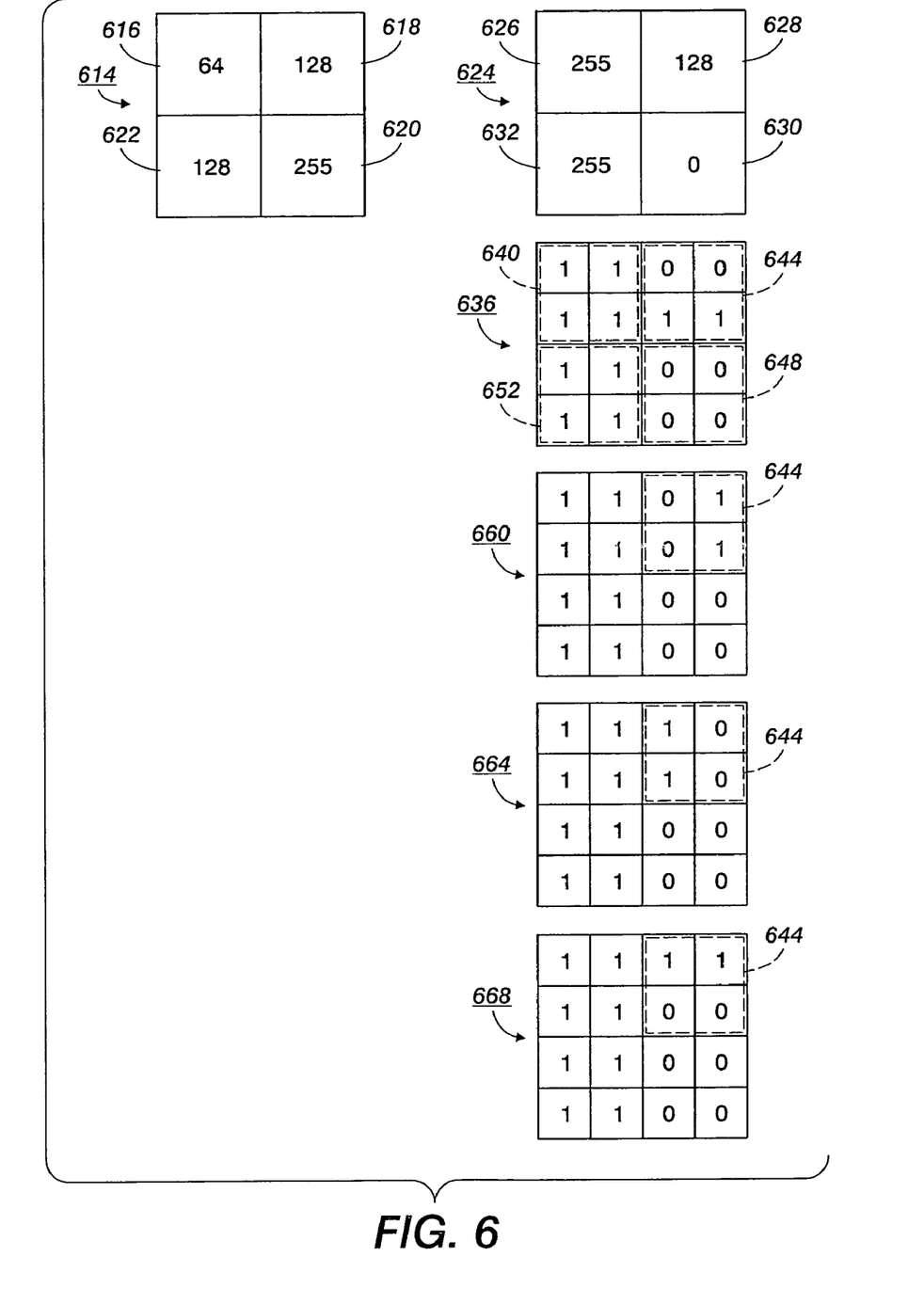
FIG. 6 includes illustrative input and output patterns related to a determination of differences associated with embodiments of the method of FIG. 3.

For instance, the key pattern 624 is associated with a first binary or high-addressable pixel output pattern 636. For example, each contone, multi-gray level or high-addressable data point 626, 628, 630, 632 is associated with a particular set of spots. For instance, the first data value 626 is associated with a first cluster 640 of spots. The second value 628 is associated with a second cluster of spots 644. The third value 630 is associated with a third cluster 648, and the fourth value 632 is associated with a fourth cluster 652. The illustrated first and fourth values 626, 632 from the key pattern 624 are equal to 255, which indicates that all the spots of the associated clusters 640, 652 are to be marked. Therefore, all the spots in the associated clusters 640, 652 are associated with the binary value of 1. The third value 630 of the key pattern 624 is equal to 0, which indicates that none of the spots in its associated cluster 648 are to be marked. Therefore, all of the spot values in the associated cluster 648 are equal to 0. The second value 628 in the key pattern is equal to 128, which indicates that half of the spots in the associated cluster 644 are to be marked. Therefore, two of the four spot values in the cluster 644 are equal to 1, and the other two spot values of the cluster 644 are equal to 0. The contone, multi-gray level or high-addressable pixel data value of 128 associated with the second position 628 in the key pattern 624 does not indicate which of the four spots in a cluster are to be marked. Therefore, the key pattern 624 could be associated with other binary patterns (e.g., 660, 664, 668), wherein the spots associated with values of 1 in the second cluster 644 are in different positions.

When the received 322 block of high-input-resolution input data (e.g., 614) and a key pattern (e.g., 624) associated with high-output-resolution output data include non-binary or multi-level contone, multi-gray level or high-addressable pixel data, determining 326 a respective difference between the pattern of the block of input-resolution input data and a respective output-resolution output pattern can include determining a sum of differences between respective contone, multi-gray level or quantization values of the received 322 block of input-resolution input data (e.g., 614) and respective contone, gray level or quantization values of a plurality of key patterns (e.g., 624) associated with a respective plurality of output-resolution output patterns. For example, in the example of FIG. 6, the sum of differences can be a sum of magnitudes of differences. For instance, the magnitude of the difference between the value at the first position 616 of the input block 614 and the value associated with the first position 626 of the key pattern is 191. The magnitude of differences between values of the second positions 618, 628, third positions 620, 630 and fourth positions 622, 632 of the illustrative input block 614 and key pattern 624 are 0, 255 and 127, respectively. Therefore, a closeness metric indicating a difference (or similarity) between the data of the input block 614 and the key pattern 624 can be based on a sum of those magnitude values, or the value 573.

Alternatively, other kinds of sums of differences can be used. For instance, a closeness metric might be based on a sum of squares of differences or on a root-mean square of differences.

However the difference between input and output patterns is determined 326, the respective output-resolution output pattern is selected 330 from among those output patterns associated with a lowest difference. For instance, the first output pattern 412 might be selected 330 to be the representative output-resolution output pattern for each of the illustrative input patterns 410, 414, 418, 422, 426, 430 of FIG. 4 because the first output pattern 412 is associated with a lowest difference (0, 1 or 2 difference bits) as compared to differences associated with the input patterns 410, 414, 418, 422, 426, 430 and the other illustrative output patterns 434, 436, 438, 440.

In practice, there may be additional output patterns from which to select 330 a representative output pattern. For instance, systems with 256, 512, 1024 and 2048 or more high-output-resolution output patterns in the predetermined 314 plurality are contemplated. There may be instances wherein a plurality of output patterns is associated with the same closeness metric or difference value for a given received 322 input pattern. In those cases, any of the patterns associated with the lowest difference or closeness metric may be selected 330 as the representative output-resolution output pattern. For example, a first or last output pattern determined to have the lowest difference may be selected 330 as the representative output pattern.

Alternatively, selecting 330 the respective high-output-resolution output pattern may include selecting the respective high-output-resolution output pattern associated with the lowest respective difference as well as a most favorable rating in a second characteristic. For instance, a relative compactness or clustering characteristic may be determined for each of the plurality of patterns associated with the lowest difference. An output pattern having the highest compactness or best clustering metric may be selected 330 as the representative output-resolution output pattern for the received 322 block of input-resolution input data.

Encoding 334 the received 322 block of input-resolution input data as the respective encoded resolution bit pattern associated 318 with the selected respective output-resolution pattern can include storing or transmitting the associated 318 encoded (lower) resolution pattern in place of the received 322 block of high-input-resolution input data.

As indicated above, the associated 318 pattern may be arbitrary or may include meaningful information in and of itself. For instance, the first output pattern 412 may be associated 318 with a pattern based on an arbitrary enumeration. That is, the first output pattern 412 may be associated with a first encoded pattern such as 00000000 or 00000001. Alternatively, the encoded pattern associated 318 with an output pattern may be selected to be a lower resolution version of the output pattern. For instance, the first output pattern 412 might be considered to be 1111111100000000 and an encoded pattern associated 318 therewith may be selected to be 11110000. As indicated above, in the example of FIG. 4, the first output pattern 412 would be selected 330 as representative output-resolution output pattern for each of the illustrative input patterns 410, 414, 418, 422, 426, 430. Therefore, each of the illustrative input patterns would be mapped or encoded 334 as the encoded resolution pattern associated 318 with the first of the pattern 412.

Figure 7:
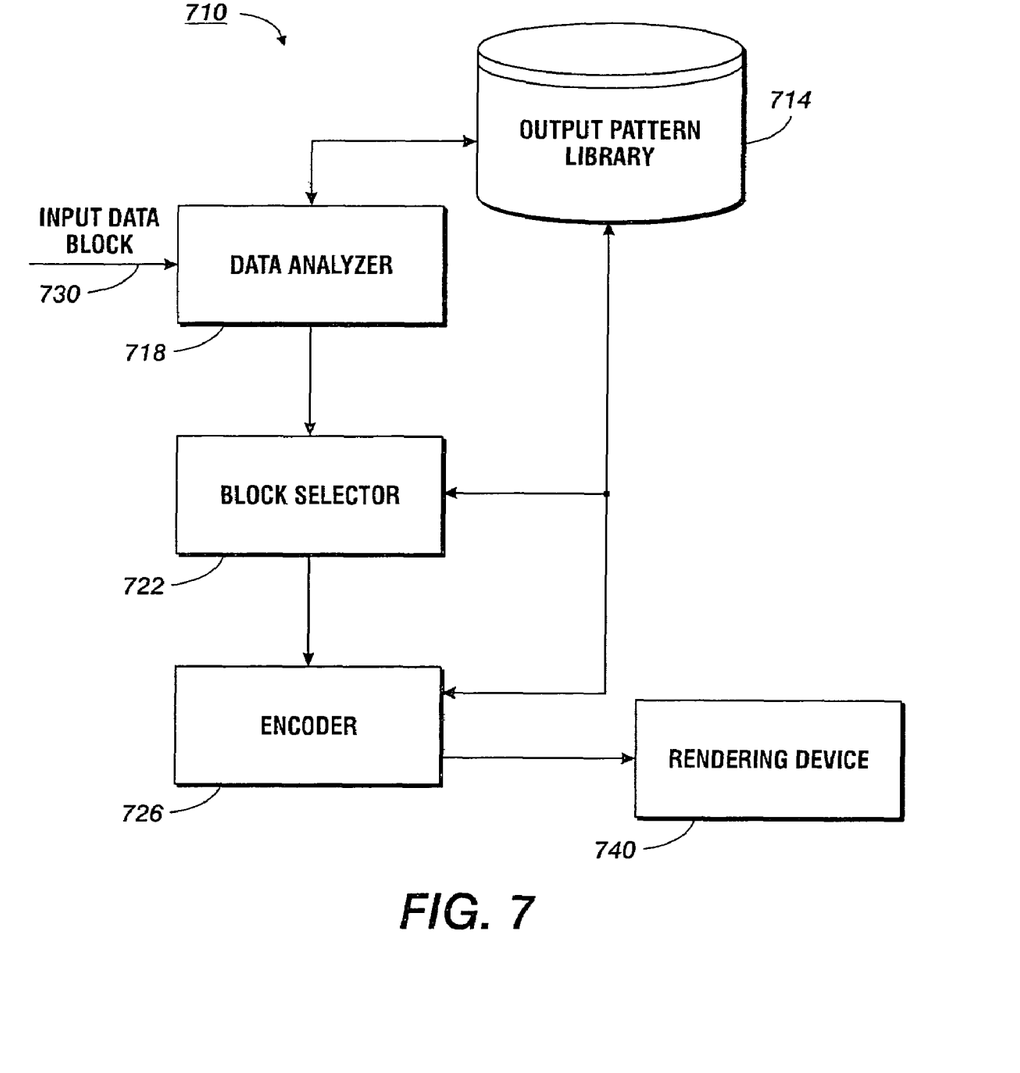
FIG. 7 is a block diagram of an illustrative system that is operative to perform data encoding according to embodiments of the method of FIG. 3.

Referring to FIG. 7, a system 710 that is operative to encode data associated with a relatively large number of bits to an encoded form having relatively reduced number of bits can include a library 714 of respective high-output-resolution output patterns (e.g., 412, 434, 436, 438, 440, 636, 660, 664, 668, 512, 522, 534, 544) associated 318 with respective encoded resolution bit patterns having the reduced number of bits. Additionally, the system 710 can include a data analyzer 718, a block selector 722 and an encoder 726. For instance, the data analyzer 718 may be operative to receive 322 a block 730 of high-input-resolution input data and determine 326 a respective difference between a pattern of the received 322 block of high-input-resolution input data and each of the respective high resolution output patterns of the library 714. The block selector 722 may be operative to select 330 a respective high-output-resolution output pattern from the library 714. For instance, the block selector 722 is operative to select 330 the respective high-output-resolution output pattern associated with the lowest difference as determined 326 by the data analyzer 718. The block selector 722 selects 330 the output pattern associated with the lowest respective difference to be a representative high-output-resolution output pattern for the received 322 block of high-input-resolution input data.

The encoder 726 may be operative to encode 334 the received 322 block of high-input-resolution input data as the respective encoded resolution bit pattern associated 318 with the respective representative high-output-resolution output pattern selected 330 by the block selector 722.

For instance, the block 730 of input data may be a block of image data and the system 710 may include or be associated with a rendering device 740. For instance, the rendering device 740 may be a display device or a marking engine, such as, for example, an ink jet, xerographic or electrophotographic marking engine or printer. For instance, the encoder 726 encodes 334 the received 322 block 730 of data prior to storing or transmitting the data in association with a rendering process of the rendering device 740.

The data analyzer 718, block selector 722 and encoder 726 can be implemented in various combinations of hardware and software. The output pattern library 714 can be implemented in any computer storage medium including, but not limited to, rotating media, such as magnetic hard drives, optical disks and floppy disks. Additionally, or alternatively, the library 714 can be implemented in programmed or configured memory devices, such as read only memory (ROM), random access memory (RAM), programmable read only memory (PROM), electrically erasable programmable read only memory (EEPROM) and FLASH memory.

The data analyzer 718 can be operative to determine 326 the respective difference by any of the techniques described above with reference to FIG. 3 including, but not limited to, by determining a number of bits that do not match between a bit pattern of the block of high-input-resolution input data and a bit pattern of each respective high-output-resolution output pattern, determining a sum of magnitudes of differences, a sum of squares of differences and a root-mean square of differences between respective contone, multi-gray level or high-addressable quantization values of the received 322 block 730 of high-input-resolution input data and respective contone, multi-gray level or high-addressable quantization values of each respective high-output-resolution output pattern, and by determining area portions (e.g., 528, 538, 548) that do not match between an area pattern (e.g., 510, 520, 530, 540) of the received 322 block 730 of high-input-resolution input data and area patterns (e.g., 512, 522, 534, 544) of each respective high-output-resolution output pattern.

The block selector 722 may be operative to select the respective output-resolution output pattern by any of the techniques described above with reference to FIG. 3 including, but not limited to, selecting an output-resolution output pattern associated with a lowest respective difference or associated with a lowest respective difference and a most favorable rating in a second characteristic, such as, for example, a most favorable or highest level of compactness or highest degree of clustering.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for encoding high resolution data associated with a relatively large number of bits to an encoded form having a relatively reduced number of bits, the method comprising:

predefining a plurality of high-output-resolution output patterns;

associating respective high-output-resolution output patterns of the plurality with a respective encoded resolution bit pattern having the reduced number of bits;

receiving a block of high-input-resolution input data;

determining a respective difference between a pattern of the received block of high-input-resolution input data and each of the respective high-output-resolution output patterns;

selecting a respective high-output-resolution output pattern associated with a lowest respective difference to be a representative high-output-resolution output pattern for the received block of high-input-resolution input data; and encoding the received block of high-input-resolution input data as the respective encoded resolution bit pattern having the reduced number of bits associated with the selected respective representative high-output-resolution output pattern.

2. The method of claim 1 wherein determining a difference between a pattern of the received block of high-input-resolution input data and each of the respective high-output-resolution output patterns comprises:

determining a number bits that do not match between a bit pattern of the received block of high-input-resolution input data and a bit pattern of each respective high-output-resolution output pattern.

3. The method of claim 1 wherein determining a difference between a pattern of the received block of high-input-resolution input data and each of the respective high-output-resolution output patterns comprises:

determining one of a sum of magnitudes of differences, a sum of squares of differences and a root mean square of differences between respective contone, multi-gray level or high-addressable quantization values of the received block of high-input-resolution input data and respective gray level or quantization values of each respective high-output-resolution output pattern.

4. The method of claim 1 wherein determining a difference between a pattern of the received block of high-input-resolution input data and each of the respective high-output-resolution output patterns comprises:

determining a number of area portions that do not match between an area pattern of the received block of high-input-resolution input data and an area pattern of each respective high-output-resolution output pattern.

5. The method of claim 1 wherein selecting a respective high-output-resolution output pattern comprises:

selecting a respective high-output-resolution output pattern associated with the lowest respective difference and a most favorable rating in a second characteristic to be the representative high resolution pattern for the received block of high-input-resolution input data.

6. The method of claim 5 wherein selecting a respective high-output-resolution output pattern associated with the lowest respective difference and the most favorable rating in a second characteristic comprises:
selecting a respective high-output-resolution output pattern associated with the lowest respective difference and a highest level of compactness.

7. The method of claim 1 wherein predefining a plurality of high-output-resolution output patterns comprises:
identifying important output patterns; and
selecting a number of the important output patterns corresponding to a number of unique bit patterns possible using the reduced number of bits.

8. The method of claim 7 wherein identifying the important output patterns comprises:
statistically analyzing blocks of a test image to determine a frequency of occurrence of patterns; and
identifying patterns that occur most frequently based on the statistical analysis.

9. A system that is operative to encode data associated with a relatively large number of bits to an encoded form having a relatively reduced number of bits, the system comprising:
a library of respective high-output-resolution output patterns associated with respective encoded resolution bit patterns having the reduced number of bits;
a data analyzer that is operative to receive a block of high-input-resolution input data and determine a respective difference between a pattern of the received block of high-input-resolution input data and each of the respective high resolution output patterns;
a block selector that is operative to select a respective high-output-resolution output pattern associated with a lowest respective difference to be a representative high-output-resolution output pattern for the received block of high-input-resolution input data; and
an encoder that is operative to encode the received block of high-input-resolution input data as the respective encoded resolution bit pattern, having the reduced number of bits, associated with the selected respective representative high-output-resolution output pattern, thereby generating an encoded block of data.

10. The system of claim 9 wherein the data analyzer is operative to determine the respective difference by determining a number bits that do not match between a bit pattern of the block of high-input-resolution input data and a bit pattern each respective high-output-resolution output pattern.

11. The system of claim 9 wherein the data analyzer is operative to determine the respective difference by determining one of a sum of magnitudes of differences, a sum of squares of differences and a root mean square of differences between respective contone, multi-gray level or high-addressable quantization values of the received block of high-input-resolution input data and respective contone, multi-gray level or high-addressable quantization values of each respective high-output-resolution output pattern.

12. The system of claim 9 wherein the data analyzer is operative to determine the respective difference by determining a number of area portions that do not match between an area pattern of the received block of high-input-resolution input data and an area patterns of each respective high-output-resolution output pattern.

13. The system of claim 9 wherein the block selector is operative to select a respective high-output-resolution output pattern associated with a lowest respective difference and a most favorable rating in a second characteristic to be a representative high-output-resolution output pattern for the received block of high-input-resolution input data.

14. The system of claim 13 wherein the block selector is operative to select a respective high-output-resolution output pattern associated with the lowest difference and a highest level of compactness.

15. The system of claim 9 further comprising:
a rendering device that is operative to receive the encoded block of data, decode the encoded block of data, thereby generating a decoded block of data and render an image portion according to the decoded block of data.

16. The system of claim 15 wherein the rendering device comprises:
a xerographic print engine.

17. A method for encoding input data having an input resolution to an encoded form having an encoded resolution, the method comprising:
predefining a plurality of respective output-resolution output patterns;
associating the respective output-resolution output patterns with respective encoded resolution encoded patterns, wherein the encoded resolution is lower than both the input resolution and the output resolution;
receiving input-resolution input data;
determining one of a number bits that do not match between a bit pattern of the input-resolution input data and a bit pattern of each respective output-resolution output pattern, a number of area portions that do not match between an area pattern of the input-resolution input data and an area pattern of each respective output-resolution output pattern, a sum of magnitudes of differences, a sum of squares of differences and a root mean square of differences between respective contone, multi-gray level or quantization values of the received block of input-resolution input data and respective contone, multi-gray level, or high-addressable quantization values of each output-resolution output pattern, thereby determining a respective difference between a pattern of the input-resolution input data and each of the respective output-resolution output patterns;
selecting a respective output-resolution output pattern associated with a lowest respective difference to be a representative output-resolution output pattern for the input-resolution input data; and
encoding the input-resolution input data as the respective encoded resolution encoded pattern associated with the selected respective output-resolution output pattern.

18. The method of claim 17 wherein selecting a respective output-resolution output pattern comprises:
selecting a respective output-resolution output pattern associated with the lowest respective difference and a most favorable rating in a second characteristic to be a representative output-resolution output pattern for the input-resolution input data.

19. The method of claim 18 wherein selecting the respective output-resolution output pattern associated with the lowest respective difference and the most favorable rating in a second characteristic comprises:
selecting the respective output-resolution output pattern associated with the lowest difference and a highest level of compactness.

20. The method of claim 17 wherein predefining a plurality output-resolution output patterns comprises:
identifying important output-resolution output patterns; and
selecting a number of the important output patterns corresponding to a number of encoded patterns possible using the encoded resolution.

21. The method of claim 20 wherein identifying the important output patterns comprises:
- statistically analyzing blocks of a test image to determine a frequency of occurrence of patterns; and
- identifying patterns that occur most frequently based on the statistical analysis.

22. A method for encoding high resolution data associated with a relatively large number of bits to an encoded form having a relatively reduced number of bits, the method comprising:
- predefining a plurality of high-output-resolution output patterns;
- associating respective high-output-resolution output patterns of the plurality with a respective encoded resolution bit pattern having the reduced number of bits;
- receiving, in a system that encodes high resolution data to an encoded form, a block of high-input-resolution input data;
- determining, in the system that encodes high resolution data to an encoded form, a respective difference between a pattern of the received block of high-input-resolution input data and each of the respective high-output-resolution output patterns;
- selecting, by the system that encodes high resolution data to an encoded form, a respective high-output-resolution output pattern associated with a lowest respective difference to be a representative high-output-resolution output pattern for the received block of high-input-resolution input data; and
- encoding, in the system that encodes high resolution data to an encoded form, the received block of high-input-resolution input data as the respective encoded resolution bit pattern having the reduced number of bits associated with the selected respective representative high-output-resolution output pattern.

23. A method for encoding input data having an input resolution to an encoded form having an encoded resolution, the method comprising:
- predefining a plurality of respective output-resolution output patterns;
- associating the respective output-resolution output patterns with respective encoded resolution encoded patterns, wherein the encoded resolution is lower than both the input resolution and the output resolution;
- receiving, in a system that encodes input data having an input resolution to an encoded form having and encoded resolution; input-resolution input data;
- determining, by the system that encodes input data having an input resolution to an encoded form having and encoded resolution; input-resolution input data, one of a number bits that do not match between a bit pattern of the input-resolution input data and a bit pattern of each respective output-resolution output pattern, a number of area portions that do not match between an area pattern of the input-resolution input data and an area pattern of each respective output-resolution output pattern, a sum of magnitudes of differences, a sum of squares of differences and a root mean square of differences between respective contone, multi-gray level or quantization values of the received block of input-resolution input data and respective contone, multi-gray level, or high-addressable quantization values of each output-resolution output pattern, thereby determining a respective difference between a pattern of the input-resolution input data and each of the respective output-resolution output patterns;
- selecting, by the system that encodes input data having an input resolution to an encoded form having and encoded resolution; input-resolution input data, a respective output-resolution output pattern associated with a lowest respective difference to be a representative output-resolution output pattern for the input-resolution input data; and
- encoding, by the system that encodes input data having an input resolution to an encoded form having and encoded resolution; input-resolution input data, the input-resolution input data as the respective encoded resolution encoded pattern associated with the selected respective output-resolution output pattern.

* * * * *